Patented Apr. 4, 1950

2,502,869

UNITED STATES PATENT OFFICE 2,502,869

7-METHYL HOMOLOG OF FOLIC ACID

Gustav J. Martin, Philadelphia, and Leo L. Tolman, Feasterville, Pa., assignors to The National Drug Company, Philadelphia, Pa., a corporation of Pennsylvania No Drawing. Application January 18, 1947, Serial No. 722,971

1 Claim. (Cl. 260—251)

It is an object of this invention to produce a new glutamic acid derivative, which has been found to have excellent chemotherapeutic properties, particularly as a displacing agent for folic acid.

Folic acid is a well known compound which is essential to the metabolism of the body. It has sometimes been referred to as Vitamin Bc. Its presence in the body is vital to the liberation and maturation of both white blood cells and red blood cells. In those cases where the body is deficient in this essential substance, the individual is afflicted with leucopenia (due to a deficiency of white blood cells) and also anemia (due to a deficiency of red blood cells). By increasing the intake of folic acid these ills can be overcome.

In addition to the advantageous properties of folic acid referred to above, it has been discovered that it also has an extremely undesirable property in that it promotes the growth of harmful bacteria present in the body. Particularly, it acts as a cofactor in the decarboxylation of tyrosine and of dihydroxyphenylalanine, which leads to the formation of pressor amines that are injurious to the hypertensive patient. We have found that the compound of the present invention displaces the folic acid in this enzyme system, thus substantially reducing its undesirable property, without at the same time noticeably affecting its desirable properties. In other words, this compound, when taken either orally or by injection, minimizes the ability of folic acid to promote the growth of harmful bacteria. At the same time it does not appreciably detract from the beneficial effects of folic acid on the liberation and maturation of white and red blood cells. This characteristic of the compound of the present invention is not only surprising but of tremendous importance.

The compound of this invention having the foregoing unusual folic acid displacing property is N-4[-([(2-amino-4-hydroxy-7-methyl-6-pteridyl)methyl]amino)benzoyl]glutamic acid. It is made by the reaction of 2,3-dibromobutyraldehyde, p-amino-benzoyl glutamic acid and 2,4,5-triamino-6-hydroxypyrimidine. Approximately equal quantities of the foregoing materials may be reacted in this manner by suspending them in an acetate buffer and stirring vigorously for about 2 hours at room temperature.

The acetate buffer may be prepared, for example, by dissolving 54.4 ccs. of acetic acid and 66.9 grams of anhydrous sodium acetate in enough water to make 1 liter of solution. The 2,3-dibromobutyraldehyde is preferably prepared freshly and employed in the undistilled form. The remaining two reactants are solids and are advisably powdered as finely as possible before adding them to the acetate buffer solution.

The crude reaction product which separates from the acetate buffer solution and may be removed by filtration has a melting point of 205–208° C. It may be purified by dissolving it in a 5% solution of sodium hydroxide followed by precipitation with hydrochloric acid. The purified product is a red-brown powder which appears to decompose without melting at a temperature about 200° C.

Either dextro- or levo-rotatory isomers may be prepared by employing the corresponding dextroglutamic acid or levo-glutamic acid.

The intermediates employed in the above reaction and the compounds from which some of these intermediates are made may be produced as hereinafter descibed:

2,3-dibromobutyraldehyde

One mole of bromine dissolved in carbon tetrachloride was added dropwise to one mole of crotonaldehyde in the same solvent. The reaction mixture was cooled during the addition.

p-Nitrobenzoylglutamic acid

Equal moles of glutamic acid and finely powdered p-nitrobenzoyl chloride were suspended in 1.5 liters of water per mole. While maintaining the temperature at 20–30° C., sodium hydroxide was added until the solution was slightly basic. This suspension was stirred and sodium hydroxide was added occasionally to keep the solution slightly basic as the reaction proceeded. This was continued until most of the p-nitrobenzoyl chloride had dissolved (about 3 hours). The mixture was filtered and the filtrate was acidified with concentrated hydrochloric acid. On standing the product crystallized and more solid precipitated from the solution. This product (50 per cent yield) melted at 111-114° C. after air drying. If appreciable quantities of p-nitrobenzoic acid are present, this heavier, more insoluble material precipitates before the p-nitrobenzoylglutamic acid. Separation of the two acids can be accomplished by this means.

p-Aminobenzoylglutamic acid

The air dried p-nitrobenzoylglutamic acid was dissolved in ethanol (25 g. per 100 cc. of solvent) and filtered to remove a small amount of insoluble material. About 5 g. of commercial Raney nickel was added to this solution and this material was reduced at 2-4 atmospheres of hydrogen. After reduction was complete, the solution was filtered and the filtrate was distilled at reduced pressure until most of the ethanol was removed. The residue was crystallized by the addition of cold ethanol and acetone. The solid product appeared to be diffcultly soluble in ethanol and was filtered and dried. The melting point of this product was 168-174° C. and the yield was about 60%.

Both the d and l isomers were prepared by the same procedure. The reactions were identical.

2,4-diamino-6-hydroxypyrimidine

Twenty-three grams (1.0 g. atoms) of sodium dissolved in a minimum of ethanol was added to a suspension of 95 g. (1.0 mole) of guanidine hydrochloride in ethanol. The mixture was filtered and the filtrate was added to an ethanolic suspension of the sodium salt of ethyl cyanoacetate. This salt was prepared by adding 113 g. (1.0 mole) of ethyl cyanoacetate to 23 g. (1.0 g. atoms) of sodium dissolved in a minimum of ethanol. This mixture was refluxed for three hours. The ethanolic solution was decanted and distilled at reduced pressure until most of the solvent was removed. The solids were combined and dissolved in a minimum of hot water. Acidification of the hot solution with acetic acid gave 100 g. of air-dried material melting at 275-277° C.

Alloxan-2,4-diimide-5-oxime 2,4 - diamino-6-hydroxypyrimidine was nitrosated by adding an equal molar amount of sodium nitrite solution to 100 g. of 2,4-diamino-6-hydroxypyrimidine dissolved in an excess of dilute sulfuric acid. The solid product was filtered and dried to give 105 g. of alloxan-2,4-diimide-5-oxime.

2,4,5-triamino-6-hydroxypyrimidine 2,4,5-triamino-6-hydroxypyrimidine was made by reducing alloxan-2,4-diimide-5-oxime with ammonium sulfide. By following this procedure with larger quantities, 105 g. of the nitroso compound was converted to 120 g. of the crystalline sulfate which was used in that form.

It is to be understood, of course, that variations in the above procedures are permissible and this invention is not restricted to the precise reactants and reaction conditions heretofore set forth.

The product of this invention, as mentioned previously, is a displacing agent for folic acid, since it has the unusual and highly desirable property of minimizing the injurious effects of folic acid without impairing the essential beneficial effects of this material. It may be administered either orally or by injection, in the form of tablets or aqueous solution. As a general rule, an average dosage would be from 5 milligrams to ½ gram per day, divided into two or three doses, the amount varying with the individual patient as well as the condition of the patient.

As many apparently widely different embodiments of this invention may be made without departing from the spirit and scope thereof, it is to be understood that the invention is not limited to the specific embodiments hereof except as defined in the appended claim.

We claim:

N-4[-([(2 - amino - 4 - hydroxy - 7 - methyl-6-pteridyl) - methyl]amino)benzoyl]glutamic acid.

GUSTAV J. MARTIN.
LEO L. TOLMAN.

REFERENCES CITED

The following references are of record in the file of this patent:

Science, vol. 103, No. 2683, pp. 667-669.